United States Patent
Ge et al.

(10) Patent No.: US 10,591,645 B2
(45) Date of Patent: Mar. 17, 2020

(54) ELECTRONIC DEVICES HAVING SCRATCH-RESISTANT ANTIREFLECTION COATINGS

(71) Applicant: Apple Inc., Cupertino, CA (US)

(72) Inventors: Zhenbin Ge, San Jose, CA (US);
Xianwei Zhao, Fremont, CA (US);
Wookyung Bae, Santa Clara, CA (US);
Sunggu Kang, San Jose, CA (US);
Ligang Wang, San Jose, CA (US);
Avery P. Yuen, San Jose, CA (US);
Stephen C. Cool, San Jose, CA (US);
John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/484,888

(22) Filed: Apr. 11, 2017

(65) Prior Publication Data

US 2018/0081085 A1    Mar. 22, 2018

Related U.S. Application Data

(60) Provisional application No. 62/396,567, filed on Sep. 19, 2016.

(51) Int. Cl.
  *G02B 1/10* (2015.01)
  *G02B 1/115* (2015.01)
  (Continued)

(52) U.S. Cl.
  CPC .............. *G02B 1/115* (2013.01); *G02B 1/14* (2015.01); *G02B 1/18* (2015.01); *G02B 5/28* (2013.01)

(58) Field of Classification Search
  CPC ............ G02B 1/118; G02B 1/115; G02B 1/18
  (Continued)

(56) References Cited

U.S. PATENT DOCUMENTS 5,506,038 A * 4/1996 Knapp ................... B32B 17/06
                                                          428/216
6,958,748 B1   10/2005 Fukui et al.
(Continued)

FOREIGN PATENT DOCUMENTS

CN   101535847    4/2011
JP   2015222412   12/2015

OTHER PUBLICATIONS

Antireflective Film for Electronic Displays, DayVue Technology, NuShield, Apr. 21, 2017, 2 pages.

*Primary Examiner* — Audrey Y Chang
(74) *Attorney, Agent, or Firm* — Treyz Law Group, P.C.; G. Victor Treyz; David K. Cole

(57) ABSTRACT

An electronic device may have transparent members such as display cover layers and camera windows. A transparent member such as a sapphire member may be provided with an antireflection coating. The antireflection coating may have a stack of dielectric thin-film interference filter layers that form a thin-film interference filter that suppresses visible light reflections. The stack of dielectric thin-film interference filter layers may have thicknesses and materials that provide the thin-film interference filter and coating with low light reflection properties while enhancing scratch resistance. An adhesion layer may be used to help adhere the stack of thin-film interference filter layer to the transparent member. An antismudge coating such as a fluoropolymer coating may be used to reduce smudging. Graded layers and layers with elevated hardness values may be used in the coating.

18 Claims, 11 Drawing Sheets

(51) Int. Cl.
  *G02B 1/18* (2015.01)
  *G02B 1/14* (2015.01)
  *G02B 5/28* (2006.01)

(58) Field of Classification Search
  USPC .................. 359/586, 580; 349/58; 428/216; 345/173
  See application file for complete search history.

(56) References Cited

U.S. PATENT DOCUMENTS

| | | | |
|---|---|---|---|
| 7,889,284 B1 | 2/2011 | Nemeth et al. | |
| 9,291,748 B2 * | 3/2016 | Momoki | G02B 1/118 |
| 2006/0017706 A1 * | 1/2006 | Cutherell | G06F 1/1643 |
| | | | 345/173 |
| 2014/0191264 A1 * | 7/2014 | Kim | H01L 33/02 |
| | | | 257/98 |
| 2015/0138638 A1 * | 5/2015 | Mashimo | G02B 1/115 |
| | | | 359/513 |
| 2015/0299470 A1 * | 10/2015 | Ngo | C09D 5/006 |
| | | | 345/173 |
| 2015/0323705 A1 * | 11/2015 | Hart | G02B 1/18 |
| | | | 359/580 |
| 2016/0370505 A1 | 12/2016 | Koo et al. | |

* cited by examiner

| Layer Count | Layer Material | Refractive Index @550nm | Layer Thickness (nm) |
|---|---|---|---|
| Substrate | Sapphire | 1.77 | |
| 1 | Si3N4 | 2.02 | 27.2 |
| 2 | SiO2 | 1.46 | 45.7 |
| 3 | Si3N4 | 2.02 | 17.0 |
| 4 | SiO2 | 1.46 | 157.7 |
| 5 | Si3N4 | 2.02 | 22.8 |
| 6 | SiO2 | 1.46 | 23.5 |
| 7 | Si3N4 | 2.02 | 73.7 |
| 8 | SiO2 | 1.46 | 69.8 |
| 9 | Si3N4 | 2.02 | 8.0 |
| Incident Medium | Air | 1.00 | |

*FIG. 8*

| LAYER | MATERIAL | INDEX | THICKNESS (nm) |
|---|---|---|---|
| 1 | DLC | 1.753 | 4 |
| 2 | SiO2 | 1.47921 | 60 |
| 3 | Si3N4 | 2.02714 | 126.55 |
| 4 | SiO2 | 1.47921 | 55.38 |
| 5 | Si3N4 | 2.02714 | 17.37 |
| 6 | SiO2 | 1.47921 | 54.45 |
| 7 | AlOx-SiOx | 1.57248 | 5 |
| Substrate | Al$_2$O$_3$ | 1.77214 | |

*FIG. 10*

| Layer # | Material | Thickness (nm) | Design Rule |
|---|---|---|---|
|  | Air |  |  |
| 1 | SIO2 | 79.7 | <80 |
| 2 | SI3N4 | 120.5 | >120 |
| 3 | SIO2 | 22.8 | <60 |
| 4 | SI3N4 | 43.9 | NA |
| 5 | SIO2 | 21.0 | <60 |
| 6 | SI3N4 | 81.2 | NA |
| 7 | SIO2 | 27.9 | <60 |
| 8 | SI3N4 | 34.6 | NA |
| 9 | SIO2 | 59.6 | <60 |
| 10 | SI3N4 | 23.2 | NA |
| 11 | SIO2 | 25.2 | <60 |
| 12 | ALSI | 5.0 |  |
| Substrate | Sapphire |  |  |
|  | Total Thk | 544.6 |  |

*FIG. 12*

| Layer # | Material | Thickness (nm) | Design Rule |
|---|---|---|---|
| | Air | | |
| 1 | SIO2 | 80.0 | <80 |
| 2 | SI3N4 | 123.2 | >120 |
| 3 | SIO2 | 22.1 | <60 |
| 4 | SI3N4 | 26.9 | NA |
| 5 | SIO2 | 16.6 | <60 |
| 6 | AlOx-SiOx | 5.0 | NA |
| Substrate | Sapphire | | |
| | Total Thk | 273.8 | <300 |

*FIG. 13*

ELECTRONIC DEVICES HAVING SCRATCH-RESISTANT ANTIREFLECTION COATINGS

This application claims the benefit of provisional patent application No. 62/396,567, filed Sep. 19, 2016, which is hereby incorporated by reference herein in its entirety.

BACKGROUND

This relates generally to optical coatings, and, more particularly, to antireflection coatings for transparent structures in electronic devices.

Electronic devices such as cellular telephones, computers, watches, and other devices contain transparent members such as display cover layers and camera windows. Transparent members such as these may be prone to undesired light reflections. Light reflections in display cover layers can obscure images that are being presented on a display. Light reflections in camera windows can create undesired image artifacts.

Light reflections such as these arise because there is an index-of-refraction difference between the material from which a transparent member is formed and surrounding air. To help reduce reflections, transparent members may be provided with antireflection coatings formed from a stack of alternating high-index-of-refraction and low-index-of-refraction dielectric layers. These antireflection coatings may be prone to damage if scratched.

SUMMARY

An electronic device may have transparent members such as display cover layers and camera windows. A transparent member such as a sapphire member may be provided with an antireflection coating.

The antireflection coating may have a stack of dielectric thin-film interference filter layers. The stack of thin-film interference filter layers may include alternating high and low refractive index layers that form a thin-film interference filter that suppresses visible light reflections. The thin-film interference filter layers may have thicknesses and materials that provide the antireflection coating with low light reflection properties while enhancing scratch resistance.

An antismudge layer such as a fluoropolymer coating may be used to reduce smudging on the antireflection coating. An adhesion layer may be used to help the thin-film interference filter layers adhere to the transparent member. Graded index layers and layers with elevated hardness values may be used in the antireflection coating.

BRIEF DESCRIPTION OF THE DRAWINGS

FIG. 8 is a table showing materials and thicknesses for an illustrative antireflection coating in accordance with an embodiment.

FIG. 10 is a table showing thicknesses and materials that may be used informing another illustrative antireflection coating in accordance with an embodiment.

FIGS. 12 and 13 are tables showing thicknesses and materials that may be used in forming additional antireflection coatings in accordance with an embodiment.

DETAILED DESCRIPTION

Electronic devices and other items may be provided with transparent structures. Antireflection coatings may be formed on the transparent structures to reduce light reflections. Illustrative configurations in which antireflection coatings are provided on transparent members for electronic devices such as transparent layers in displays and windows for cameras and other light-based devices may sometimes be described herein as an example. In general, however, antireflection coatings may be formed on any suitable transparent members.

Figure 1:
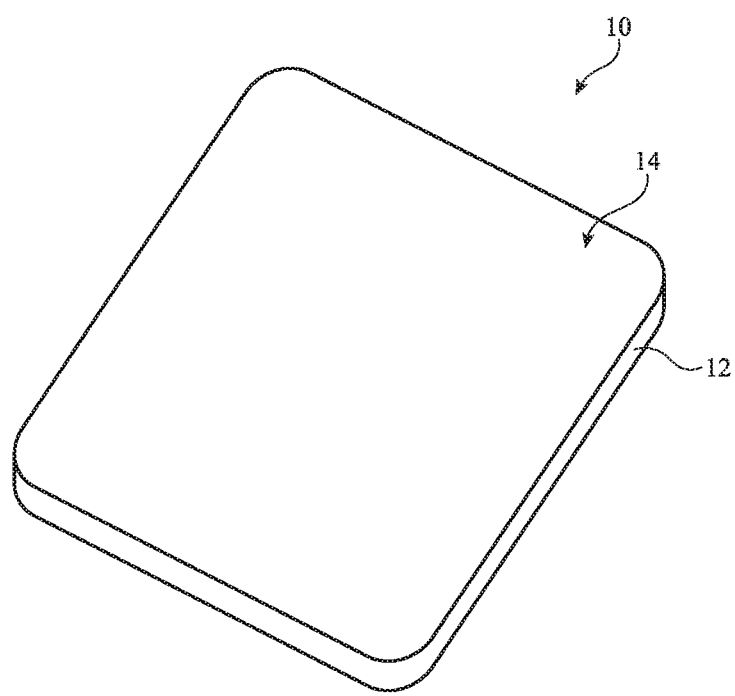
FIG. 1 is a perspective view of an illustrative electronic device of the type that may include transparent members with antireflection coatings in accordance with an embodiment.

An illustrative electronic device of the type that may be provided with transparent members having antireflection coatings is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Figure 2:
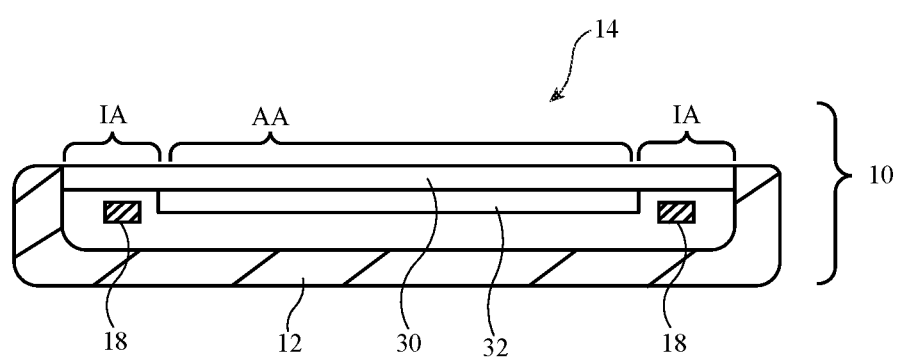
FIG. 2 is cross-sectional side view of an illustrative electronic device having a display cover layer that may be provided with an antireflection coating in accordance with an embodiment.

Display 14 may be covered with a protective outer layer. This outer layer, which may sometimes be referred to as a display cover layer, may be formed from a hard transparent material to help protect display 14 from damage. A cross-sectional side view of device 10 in an illustrative configuration in which display 14 has a display cover layer is shown in FIG. 2. As shown in FIG. 2, display 14 may have one or more display layers that form pixel array 32. During operation, pixel array 32 forms images for a user in active area AA of display 14. Display 14 may also have inactive areas IA (e.g., areas along the border of pixel array 32) that are free of pixels and that do not produce images. Display cover layer 30 of FIG. 2 overlaps pixel array 32 in active area AA and overlaps electrical components 18 in inactive areas IA. Electrical components 18 may be light-based components such as image sensors (e.g., two-dimensional visible light image sensors in cameras), proximity sensors (e.g., proximity sensors that emit light using an infrared light source such as a light-emitting diode and that detect reflected light using an infrared light detector), monochrome ambient light sensors, color-sensitive ambient light sensors, status indicator lights, infrared-light-emitting and/or visible-light-emitting components such as camera flash light-emitting diodes or other light sources for providing pulsed and/or steady-state illumination (e.g., one or more visible or infrared light-emitting diodes and/or visible or infrared lasers), and/or other light-based components. These components may operate through overlapping openings (sometimes referred to as windows or window openings) in an opaque masking layer that is formed on the underside of display cover layer 20 in inactive areas IA as shown in FIG. 2 and/or may operate through stand-alone window members (e.g., windows formed in housing 12) or other transparent members that overlap components 18 in device 10.

Display cover layer 30 may be formed from a transparent material such as glass, plastic, ceramic, or crystalline materials such as sapphire. Illustrative configurations in which a display cover layer and other transparent members in device 10 (e.g., windows for cameras and other light-based devices that are formed in openings in housing 12) are formed from a hard transparent crystalline material such as sapphire (sometimes referred to as corundum or crystalline aluminum oxide) may sometimes be described herein as an example. Sapphire makes a satisfactory material for display cover layers and windows due to its hardness (9 Mohs). In general, however, these transparent members may be formed from any suitable material.

Display cover layer 30 for display 14 may planar or curved and may have a rectangular outline, a circular outline, or outlines of other shapes. If desired, openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, or to form audio ports (e.g., openings for speakers and/or microphones). If desired, openings may be formed in housing 12 to accommodate light-based components (optical components) such as components 18. For example, window openings may be formed in a housing wall and these window openings may be covered with a protective transparent window member.

Antireflection coatings may be formed on display cover layers to reduce reflections and thereby help users view images on display 14. Antireflection coatings may also be formed on transparent windows in device 10.

Figure 3:
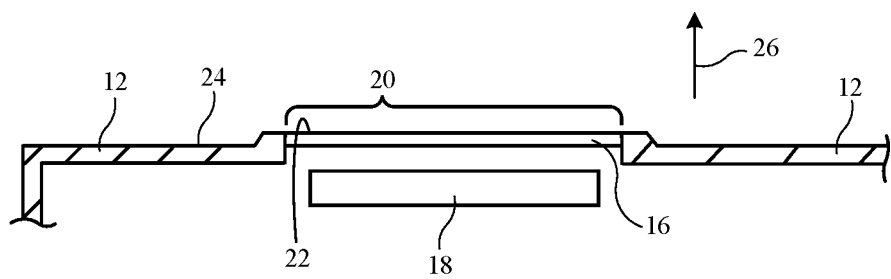
FIG. 3 is a cross-sectional side view of an illustrative electronic device window such as a camera window that may be provided with an antireflection coating in accordance with an embodiment.

A cross-sectional side view of an illustrative window in a portion of housing 12 is shown in FIG. 3. As shown in FIG. 3, light-based component 18 may be mounted in alignment with opening 20 in housing 12. Opening 20 may be circular, may be rectangular, may have an oval shape, may have a triangular shape, may have other shapes with straight and/or curved edges, or may have other suitable shapes (outlines when viewed from above). Window member 16 may be mounted in window opening 20 of housing 12 so that window member 16 overlaps component 18. A gasket, bezel, adhesive, screws, or other fastening mechanisms may be used in attaching window member 16 to housing 12. Surface 22 of window member 16 may lie flush with surface 24 of housing 12, may be recessed below surface 24, or may, as shown in FIG. 3, be proud of surface 24 (i.e., surface 22 may lie in a plane that is some distance away from surface 24 in direction 26). Surface 24 may form the rear face of housing 12, a portion of a sidewall in housing 12, or other suitable portion of housing 12.

As described in connection with FIG. 2, light-based device 18 may be based on one or more components that emit light (e.g., a light-emitting diode, a laser, a lamp, etc.) and/or one or more components that detect light (e.g., an image sensor that captures digital images through a lens, a proximity sensor detector that measures infrared light from an infrared emitter that has reflected off of external objects adjacent to device 10, an ambient light sensor that measures the intensity and/or color of ambient light, or other light producing and/or light measuring circuitry). With one illustrative configuration, window member 16 is a circular or rectangular window member and device 18 includes a rectangular image sensor and a lens that is interposed between the window member and the rectangular image sensor. Other types of light-based devices may be aligned with windows such as illustrative window 16 of FIG. 3. The configuration of FIG. 3 is merely illustrative.

Transparent members for device 10 such as a display cover layer member (see, e.g., layer 30 of FIG. 2) in display 14 or window member 16 may be formed from a durable material such as sapphire, other hard crystalline materials, glass (e.g., strengthened glass), or other transparent materials (sometimes referred to as transparent substrates or transparent layers). Hard materials (particularly materials such as sapphire with a Mohs hardness of 9 or more, but also materials that are softer such as materials with a hardness of 8 Mohs or more or other suitable hard materials) will tend to resist scratches when the transparent members are subject to wear from normal use. Softer materials may also form acceptable window members, particularly when coated with scratch-resistance coatings. Illustrative configurations in which the transparent members for device 10 (e.g., display cover layers for display 14 such as layer 30 of FIG. 2 and window members such as window member 16 of FIG. 3) are formed from sapphire (i.e., crystalline aluminum oxide) may sometimes be described herein as an example. In general, these transparent members may be formed from any suitable materials.

Sapphire has a relatively large refractive index (1.8), which causes sapphire structures to reflect light. Light reflections can make it difficult to view images on display 14 and can interfere with image capture operations and other operations using windows 16. To suppress light reflections, transparent sapphire members or other transparent members in device 10 may be provided with antireflection coatings. The antireflection coatings may be configured to resist scratching.

Figure 4:
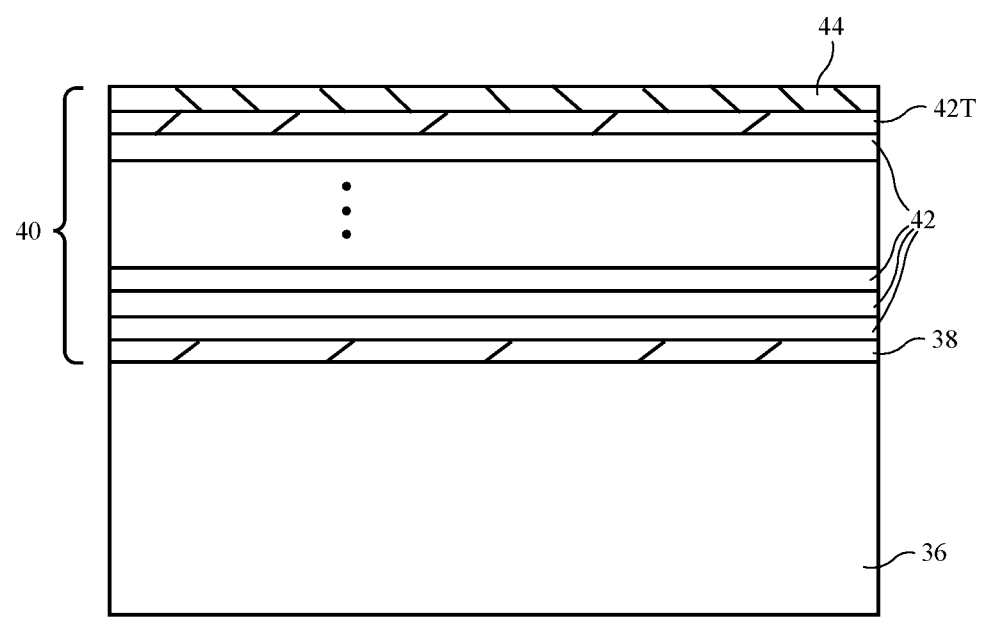
FIG. 4 is cross-sectional side view of an illustrative transparent member with an antireflection coating in accordance with an embodiment.

An illustrative antireflection coating for a transparent member in device 10 is shown in FIG. 4. As shown in FIG. 4, antireflection coating 40 may be formed on transparent member 36. Transparent member 36, which may sometimes be referred to as a substrate, may be a display cover layer such as display cover layer 30 of FIG. 2, a camera window member such as camera window member 16 of FIG. 3, or other transparent structure in device 10. Transparent member 36 may be formed from glass, plastic, ceramic, sapphire or other crystalline materials, or other transparent material. The thickness of member 36 may be 0.1 mm to 5 mm, more than 0.3 mm, more than 0.5 mm, less than 3 mm, less than 2 mm, less than 1.5 mm, or less than 1 mm (as examples).

Antireflection coating 40 may reduce light reflections at visible wavelengths (and/or, if desired, at other wavelengths such as near infrared wavelengths). For example, the use of coating 40 on member 36 may reduce visible light and/or infrared light reflectivity by at least 10%, by at least 40%, by at least 70%, by 30-90%, or by other suitable amounts. Coating 40 includes a thin-film interference filter formed from a stack of layers of material such as inorganic dielectric layers with different index of refraction values (see, e.g., layers 42 and layer 42T). These layers may be configured to form a thin-film interference filter that suppresses visible light (and/or infrared light) reflections by selection of appropriate thicknesses and refractive index values for each of the layers and by adjustment of the total number of layers. The lowermost of the thin-film interference filter layers 42 faces transparent member 36 and may be formed on member 36 or on interposed adhesion layer 38. The uppermost of the thin-film interference filter layers (layer 42T) faces away from substrate 36 and may optionally be coated with antismudge layer 44. There may be any suitable number of thin-film layers in the thin-film interference filter of coating 40 (e.g., 3-10, 5-20, more than 5, more than 10, more than 15, fewer than 50, fewer than 30, fewer than 25, etc.).

The thin-film interference filter layers may have higher index of refraction values (sometimes referred to as "high" index values) and lower index of refraction values (sometimes referred to as "low" index values). With one illustrative configuration, the thin-film interference filter is formed from alternating high and low refractive index layers. Examples of low-index materials include silicon oxide ($SiO_2$) and magnesium fluoride ($MgF_2$). These materials may have an index of refraction of 1.5 or lower. Examples of high index materials include titanium dioxide ($TiO_2$), niobium oxide ($Nb_2O_5$), tantalum oxide ($Ta_2O_5$), zirconium oxide ($ZrO_2$), hafnium oxide ($HfO_2$), silicon nitride ($Si_3N_4$), and yttrium oxide ($Y_2O_3$), aluminum oxide ($Al_2O_3$), aluminum nitride (AlN), and diamond-like carbon. These materials may have a refractive index of 1.7 or higher (e.g., at least 1.8, at least 1.9, or at least 2.0). Diamond-like carbon (sometimes referred to as hard carbon) is amorphous carbon having a mixture of $sp^2$ (graphite) and $sp^3$ (diamond) phases. Other materials may be used in forming the thin-film layers of the thin-film interference filter for coating 40, if desired. These materials are merely illustrative.

To help adhere the thin-film interference filter coating layers to substrate 36, an adhesion layer such as adhesion layer 38 may be interposed between layers 42 and substrate 36. Adhesion layer 38 may be formed from a graded index material or a constant index material and may enhance adhesion of coating 40 to substrate materials such as a sapphire (crystalline aluminum oxide) or other substrate materials.

To help prevent smudging on the outermost surface of coating 40, the outer surface of coating 40 may be provided with an antismudge layer such a layer 44. Layer 44 may be formed from a polymer such as a fluoropolymer or other material that resists smudging. Antismudge layer 44 may be relatively thin (e.g., 7 nm, less than 10 nm, 3-8 nm, more than 2 nm, etc.) and may have a relatively low index of refraction (e.g., 1.37). Layer 44 may therefore not have a significant impact on the antireflection performance of coating 40.

Low index-of-refraction materials such as silicon oxide may be vulnerable to scratching. To enhance the anti-scratch performance of coating 40, the uppermost thin-film layer in the thin-film interference filter (thin-film antireflection coating interference filter layer 42T) may be formed from a material that is harder than silicon oxide such as a high index material (e.g., silicon nitride, hafnium oxide, diamond like carbon, etc.). The use of a high index material in forming layer 42T may help reduce vulnerability to scratching, while resulting in only a small loss of antireflection performance relative to use of a low index material such as silicon dioxide in forming layer 42T.

Layers for coating 40 such as uppermost thin-film interference filter layer 42T and adhesion layer 38 (and, if desired, intermediate thin-film interference filter layers) may be formed from ungraded materials (bulk materials), graded materials (mixtures of multiple materials with varying proportions), or multilayer films. Illustrative configurations that may be used for uppermost thin-film interference filter layer 42T and/or adhesion layer 38 are shown by layer 50 of FIGS. 5, 6, and 7.

Figure 5:
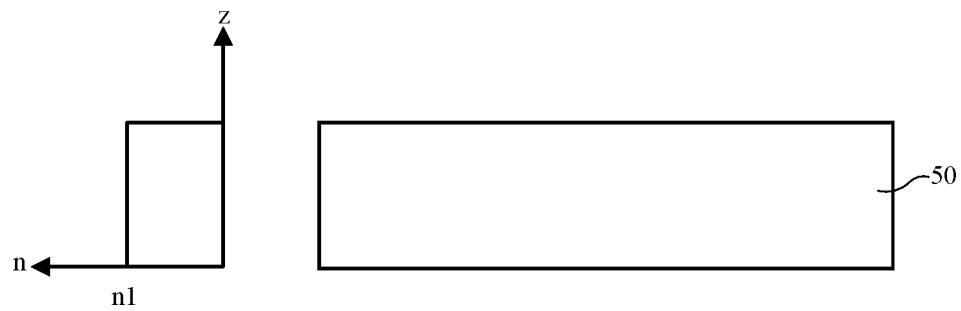
FIG. 5 is a diagram showing how a layer in an antireflection coating may be characterized by a constant index of refraction in accordance with an embodiment.

As shown in FIG. 5, an ungraded material (e.g., a solid layer of hafnium oxide, silicon nitride, diamond like carbon, or other high index material) has a composition that is constant throughout its thickness and therefore is characterized by a constant index of refraction n (e.g., n is equal to n1 at all positions z through the thickness of layer 50).

Figure 6:
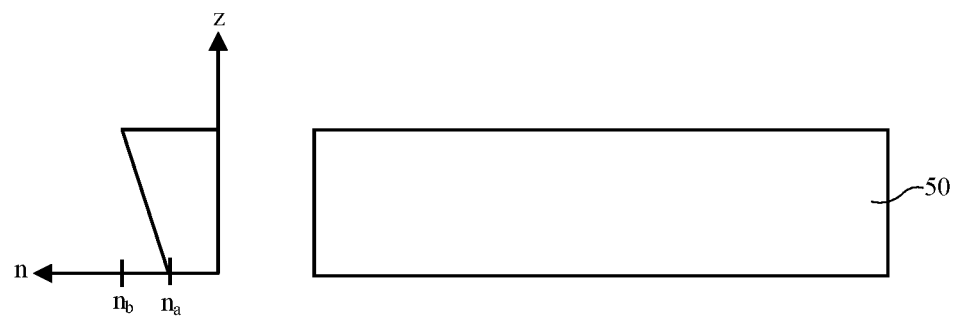
FIG. 6 is a diagram showing how a layer in an antireflection coating may be characterized by a graded index of refraction in accordance with an embodiment.

As shown in FIG. 6, layer 50 may be formed from a graded material (a graded refractive index material). A graded material may, for example, be formed from a varying mixture of two materials such as aluminum oxide and zirconium oxide or other suitable materials. The relative concentration of each of these component materials may be continuously varied as a function of thickness z through layer 50. For example, at z1, layer 50 may be formed from 100% aluminum oxide and may be characterized by refractive index na. At z2, layer 50 may be formed from 100% zirconium oxide and may be characterized by refractive index nb. At intermediate z values (values of z corresponding to locations between z1 and z2), the relative concentrations of aluminum oxide and zirconium oxide may be gradually varied (i.e., aluminum oxide may drop in concentration with increasing z values and zirconium oxide may increase in concentration with increasing z values) and refractive index n may smoothly vary from na to nb. Any two materials may be mixed in varying proportions to form a graded index layer such as layer 50 of FIG. 6 (e.g., silicon oxide and silicon nitride, aluminum oxide and silicon oxide, etc.). The use of a mixture of aluminum oxide and zirconium oxide in forming layer 50 is merely illustrative.

Figure 7:
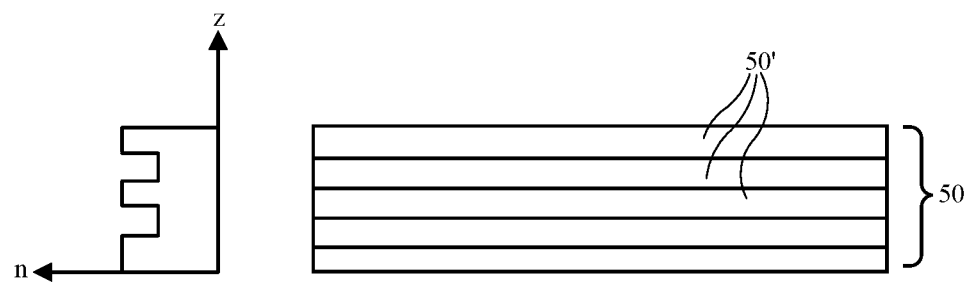
FIG. 7 is a diagram showing how a layer in an antireflection coating may have multiple sublayers with different refractive index values in accordance with an embodiment.

A multilayer film configuration for layer 50 is shown in FIG. 7. In this arrangement, layer 50 is formed from a stack of layers (sublayers) 50'. Layers 50' may be, for example, alternating thin layers of silicon oxide and zirconium oxide or alternating thin layers of silicon oxide and silicon nitride. The thickness of sublayers 50' may be sufficiently small and the number of layers 50' in multilayer films such as layer 50 of FIG. 7 may be sufficiently limited that the overall thickness of layer 50 is less than 60 nm, less than 20 nm, 1-20 nm, 3-20 nm, more than 1 nm or other suitable thickness. For example, layers 50' may be sufficiently thin (e.g., 1-5 nm, more than 0.5 nm, less than 6 nm, etc.) that 4-20 of these layers has a thickness of 1-20 nm. The use of multilayer film configurations for layer 50 may help strengthen layer 50. Layer 50 may also be strengthened by doping the material of layer 50 with a small concentration of dopant. As an example, a layer 50 of silicon dioxide may be doped with 2-5% hafnium or zirconium (e.g., by cosputtering) to improve silicon dioxide hardness.

When forming adhesion layer 38, it may be desirable to use a gradient film configuration (see, e.g., FIG. 6) so that layer 38 can form a robust interface between substrate 36 and the lowermost of layers 42. If, as an example, the lowermost layer of layers 42 facing substrate 36 is a silicon oxide layer and substrate 36 is a sapphire (aluminum oxide) layer, a gradient adhesion layer may be used that smoothly transitions from 100% aluminum oxide (at the interface between layer 38 and substrate 36) to 100% silicon oxide (at the interface between layer 38 and the lowermost silicon oxide layer of layers 42). Gradient layers may also be formed from other mixtures of materials (e.g., silicon oxide mixed with diamond like carbon, silicon oxide mixed with silicon nitride, etc.). Adhesion layer 38 may also be formed from other materials, if desired.

It may be desirable to use a hard material (e.g., a solid ungraded material that has a high bulk hardness) when forming uppermost thin-film interference filter layer 42T. The hard material may have a hardness of greater than 7 Mohs, greater than 8 Mohs, etc. or a Knoop hardness of at least 900, at least 1000, at least 1200, or at least 1500. For example, it may be desirable to use a high index material such as silicon nitride, hafnium oxide, diamond like carbon or other high index material to form layer 42T. If desired, a hardened low index material such as silicon oxide doped with zirconium or hafnium may be used. Multilayer films (e.g., a multilayer film such as layer 50 of FIG. 7 that is formed from alternating silicon oxide and silicon nitride sublayers or other alternating refractive index materials with a sublayer thickness of a few nm) may also be used in forming layer 42T. The thickness of layer 42T when formed from a high-index material may be maintained relatively small (e.g., 1-20 nm, more than 0.5 nm, less than 25 nm) to help maintain desired levels of anti-reflection performance while enhancing scratch resistance. If desired, layer 42T may be a graded layer. In configurations in which a graded layer is used for forming layer 42T, the harder of two materials used in forming the graded mixture for the layer may have its highest concentration on the uppermost surface of layer 42T. For example, the innermost surface of layer 42T may be a relatively softer material such as silicon oxide and the outermost surface of layer 42T may be a relatively harder material such as silicon nitride. With configurations such as these, a hard material is presented on the upper surface of layer 42T that helps coating 40 resist scratching.

The layers of coating 40 may be deposited using any suitable deposition techniques. Examples of techniques that may be used for depositing layers in coating 40 (e.g., inorganic dielectric layers) include chemical vapor deposition, cathodic arc deposition, and magnetron sputtering (e.g., for depositing diamond like carbon).

FIG. 8 is a table showing illustrative materials and layer thicknesses that may be used in forming coating 40. In the example of FIG. 8, substrate 36 has been formed from sapphire and adhesion layer 38 has been omitted. Thin-film interference filter layers 42 have been formed from alternating silicon nitride and silicon oxide thin-films. Outermost thin-film layer 42T has been formed from a thin (8 nm) layer of a hard material such as silicon nitride (e.g., a high index material).

Figure 9:
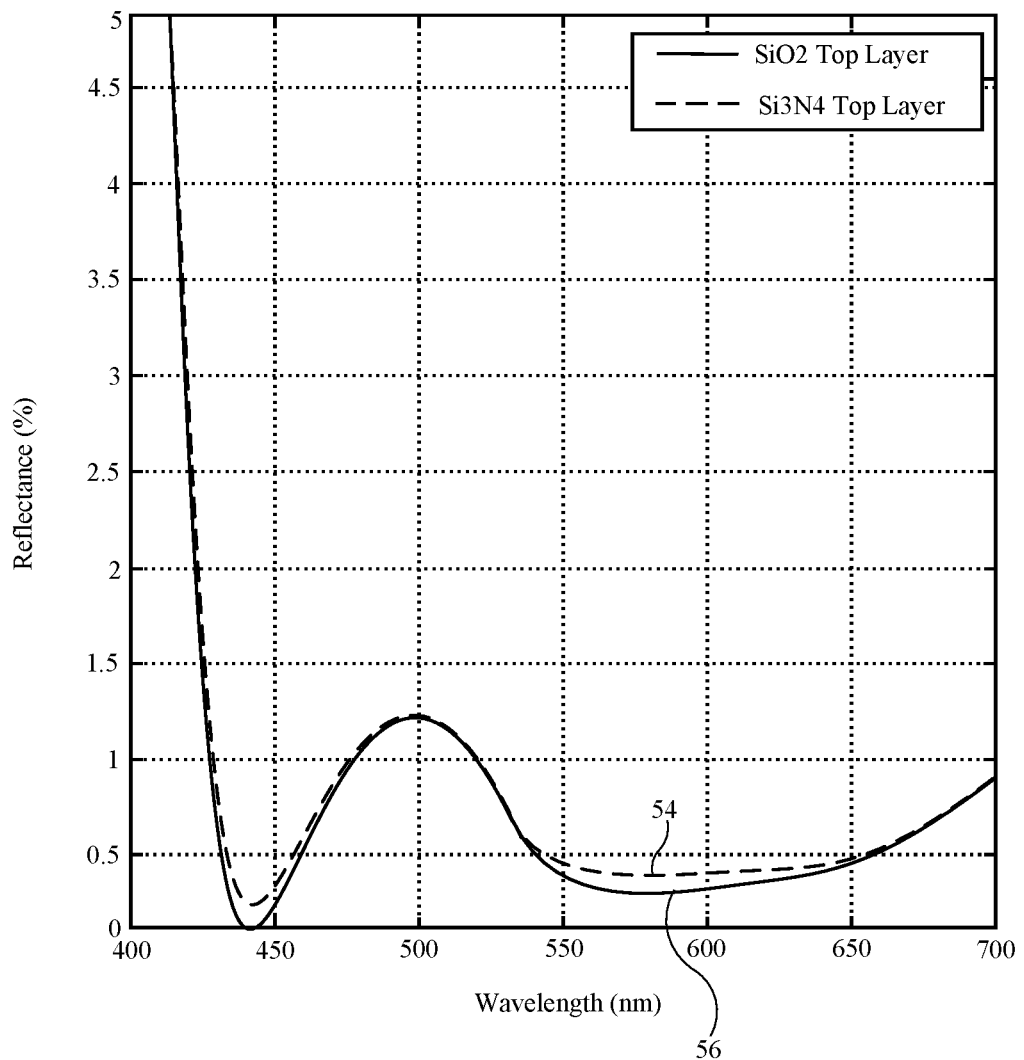
FIG. 9 is a graph in which reflectance has been plotted as a function of wavelength for illustrative antireflection coatings such as an antireflection coating of the type shown in FIG. 8 in accordance with an embodiment.

Curve 54 in the graph of FIG. 9 illustrates the visible light antireflection performance (reflectance from 400-700 nm) of coating 40 of FIG. 8. If the outermost layer of the thin-film filter layers of coating 40 were to be formed from a low index material such as silicon oxide, performance could be further enhanced, as illustrated by curve 56, but scratch resistance would be reduced.

Figure 11:
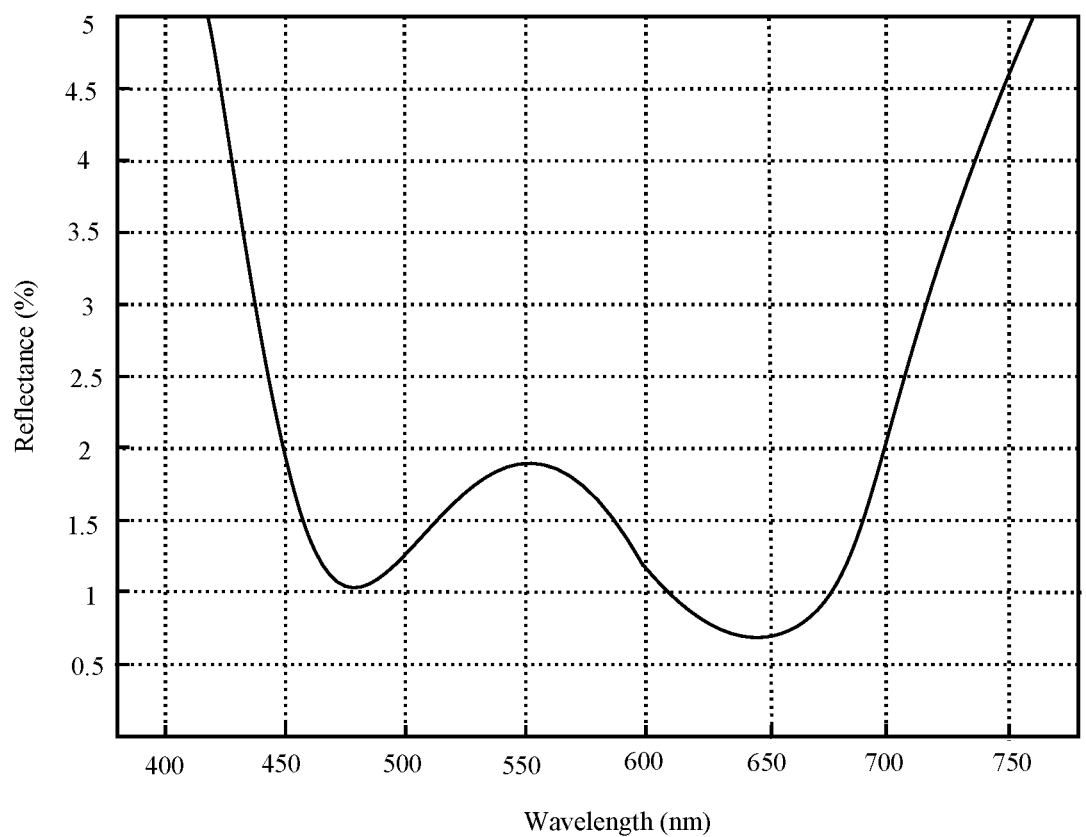
FIG. 11 is a graph in which reflectance has been plotted as a function of wavelength for an antireflection coating of the type shown in FIG. 10 in accordance with an embodiment.

Another illustrative configuration for layer 40 is shown in FIG. 10. In the example of FIG. 10, substrate 36 has been formed from sapphire. Adhesion layer 38 has been formed from a graded layer that changes composition smoothly from 100% aluminum oxide at the interface with substrate 36 to 100% silicon oxide at the interface with the lowermost layer 42, which is formed from silicon oxide. Uppermost layer 42T has been formed from diamond like carbon (DLC) to provide coating 40 with enhanced scratch resistance. The hardness of the diamond like carbon may be 100 GPa (e.g., a Knoop hardness of 1500 or more), etc. The thickness of layer 42T may be, for example, 2-20 nm, 4 nm, 3-5 nm, 2-6 nm, more than 2 nm, more than 6 nm, less than 20 nm, less than 12 nm, less than 8 nm, or less than 6 nm. Diamond like carbon may absorb visible light, so it may be desirable to minimize the thickness of coating 42T to reduce light absorption in coating 40. FIG. 11 is a diagram in which the visible light reflectance for coating 40 of FIG. 10 has been plotted as a function of wavelength, showing how the use of a scratch resistant outer layer for coating 40 has not significantly degraded antireflection coating performance.

Coatings such as the illustrative coating of FIG. 8 and the illustrative coating of FIG. 10 may, if desired, by provided with antismudge layers such as layer 44. Antismudge layer 44 may help reduce friction and thereby reduce the likelihood that scratches will develop in coating 40.

If desired, the layers of coating 40 may follow design rules that minimize stress and thereby reduce the likelihood of scratching. For example, scratching may be minimized by ensuring that the uppermost thin-film interference filter layer (e.g., a layer 42T of silicon oxide or other suitable material) is formed with a thickness of less than a predetermined threshold (e.g., 80 nm, a value of 70-90 nm, etc.). As another example, scratching may be minimized by ensuring that the secondmost upper layer 42 (i.e., the second-to-top layer 42, which is adjacent to and lies directly under layer 42T) has a high microhardness (e.g., a Knoop hardness at least 1000) and a thickness of at least 120 nm. Another factor that may limit scratching involves the thickness of the low index layers in coating 40 (e.g., the silicon oxide layers in coating 40). Scratching may be minimized by limiting the thicknesses of these low index layers to less than a predetermined threshold amount (e.g., 60 nm or a value between 50-70 nm, etc.). A further design rule that may be applied to coating 40 involves the total thickness of coating layer 40. When coating 40 is applied to a hard substrate such as a sapphire substrate, it may be desirable to limit the total thickness of coating 40 to a predetermined thickness to enhance scratch resistance. As an example, scratch resistance may be enhanced by forming coating 40 with a thickness that is less than a predetermined amount such as 300 nm or that is less than a value between 250 and 350 nm or other suitable maximum coating layer thickness.

Illustrative configurations for coating 40 that illustrate the application of these constraints are shown in FIGS. 12 and 13.

In the example of FIG. 12, coating 40 has an aluminum silicon adhesion layer 38 that is interposed between the lowermost (innermost) of thin-film layers 42 and a sapphire substrate 36. Uppermost (outermost) layer 42T is formed from silicon oxide to enhance antireflection performance. To enhance antireflection performance, uppermost layer 42T has been formed from a low index material such as silicon oxide. To prevent the formation of deep scratches in coating 40, the thickness of layer 42T is relatively small (e.g., less than 80 nm). To help prevent scratches in layer 42T from penetrating farther into coating 20 than the thickness of layer 42T, the secondmost upper layer of coating 40 (i.e., second-to-top thin-film interference filter layer 2 in the example of FIG. 12) is formed from a hard material (e.g., a high index layer such as a layer of silicon nitride having a Knoop hardness of at least 1000, at least 1100, or at least 1200 and having a refractive index of at least 1.8, at least 1.9, or at least 2.0). The presence of a hard layer under layer 42T helps make it difficult to deform layer 42T and helps reduce scratching or other damage that might result from crushing coating 40. The thickness of the hard layer (layer 2) may be relatively large (e.g., at least 120 nm or other thickness that is greater than the thickness of layer 1, that is more than 115% of the thickness of layer 1, that is more than 130% of the thickness of layer 1, etc.). The thicknesses of the low index (softer) layers of coating 40 under layer 2 (e.g., the thicknesses of layer 3, layer 5, layer 7, layer 9, and layer 11 of FIG. 12) are preferably small. In particular, these layers may be less than 60 nm in thickness or may be less than other suitable predetermined thickness threshold values (e.g., a threshold of 70 nm, etc.) to ensure that coating 40 is sufficiently strong to resist crushing and scratching.

In the example of FIG. 13, coating 40 has a graded adhesion layer. Substrate 36 has been formed from sapphire. The lowermost thin-film interference filter layer 42 of coating 40 (i.e., layer 5) has been formed from silicon oxide. Adhesion layer 38 has been formed from a graded mixture of aluminum oxide and silicon oxide. The concentration of aluminum oxide is 100% at the interface between layer 38 and substrate 36. The concentration of silicon oxide is 100% at the interface between layer 38 and layer 5. Between these two interfaces, the concentration of aluminum oxide and silicon oxide are smoothly varied. Layers 42 are formed from alternating low index and high index layers (e.g., alternating layers of silicon oxide and silicon nitride). To help enhance the strength of coating 40, the total thickness of coating 40 has been restricted and is less than a predetermined maximum thickness. In the FIG. 13 configuration, the thickness of coating 40 is less than 300 nm. If desired, the predetermined maximum thickness may have other values (e.g., a value of between 250-350 nm). Coating 40 of FIG. 13 also contains low index layers that are not too thick (e.g., layers 3 and 5 are less than 60 nm) and contains an uppermost layer (low index layer 42T) that is less than a predetermined maximum thickness (e.g., less than 80 nm). The secondmost upper layer 42 (i.e., second-to-top layer 2) is a hard layer that is at least 120 nm thick to help prevent deep scratches.

If desired, antismudge coatings may be formed on upper layers 42T of coatings 40 of FIGS. 12 and 13 and/or other coatings 40 on transparent member 36. Although layers 42T of FIGS. 12 and 13 are silicon oxide layers, the outermost thin-film interference filter layers in these coatings may, if desired, be formed from other low index layers, graded index layers, or thin film layers of high index material (e.g., silicon nitride, hafnium oxide, diamond like carbon, etc.).

The foregoing is merely illustrative and various modifications can be made to the described embodiments. The foregoing embodiments may be implemented individually or in any combination.

What is claimed is:

1. An electronic device having an interior and an exterior, comprising:
   a housing;
   a component in the housing;
   a transparent member that overlaps the component and that separates the interior of the electronic device from the exterior of the electronic device, wherein the transparent member has a first surface that faces the exterior and an opposing second surface;
   a visible light antireflection coating on the first surface of the transparent member that includes a stack of thin-film interference filter layers including an uppermost thin-film interference filter layer having a first index of refraction, a lowermost thin-film interference filter layer between the uppermost thin-film interference filter layer and the transparent member, and a second-to-top thin-film interference filter layer that is adjacent to the uppermost thin-film inference filter layer and that has a second index of refraction that is lower than the first index of refraction; and
   an adhesion layer between the lowermost thin-film-interference filter layer and the transparent member, wherein the adhesion layer comprises a graded index layer.

2. The electronic device defined in claim 1 further comprising an antismudge layer on the uppermost thin-film interference filter layer.

3. The electronic device defined in claim 2 wherein the uppermost thin-film interference filter layer comprises a layer selected from the group consisting of: a silicon nitride layer, a hafnium oxide layer, and a diamond-like carbon layer.

4. The electronic device defined in claim 3 wherein the second-to-top thin-film interference filter layer is a silicon oxide layer.

5. The electronic device defined in claim 4 wherein the transparent member comprises a sapphire member and wherein the uppermost thin-film interference filter layer has a thickness of less than 20 nm.

6. The electronic device defined in claim 1 wherein the component comprises a camera.

7. The electronic device defined in claim 1 wherein the graded index layer comprises a mixture of aluminum oxide and silicon oxide.

8. The electronic device defined in claim 7 wherein the lowermost thin-film interference filter layer comprises a silicon oxide layer.

9. The electronic device defined in claim 1 wherein the lowermost thin-film interference filter is formed on the transparent member and comprises a first material and wherein the uppermost thin-film interference filter comprises a second material that is the same as the first material.

10. The electronic device defined in claim 1 wherein the adhesion layer has opposing first and second surfaces, wherein the first surface contacts the transparent member, and wherein the second surface contacts the lowermost thin-film interference filter layer.

11. An electronic device, comprising:
a camera;
a transparent sapphire member that overlaps the camera; and
a visible light antireflection coating on the sapphire member that includes a stack of thin-film interference filter layers including an uppermost thin-film interference filter layer having a first index of refraction, wherein the uppermost thin-film interference filter layer has an index of refraction of greater than 2.0, a lowermost thin-film interference filter layer between the uppermost thin-film interference filter layer and the transparent sapphire member, a second-to-top thin-film interference filter layer that is adjacent to the uppermost thin-film interference filter layer and that has a second refractive index that is lower than the first index of refraction, wherein the uppermost thin-film interference filter layer comprises the same material as at least one of the other thin-film interference filter layers, wherein each filter layer of the stack of thin-film interference filter layers has an individual thickness, and wherein the individual thickness of the uppermost thin-film interference filter layer is less than all of the other individual thicknesses of the thin-film interference filter layers.

12. The electronic device defined in claim 11 further comprising an antismudge layer on the uppermost thin-film interference filter layer, wherein the uppermost thin-film interference filter has a Knoop hardness of at least 1500.

13. The electronic device defined in claim 11 wherein the stack of thin-film interference filter layers comprises a plurality of silicon oxide layers and wherein the uppermost thin-film interference filter layer comprises a layer selected from the group consisting of: titanium dioxide, niobium oxide, tantalum oxide, zirconium oxide, hafnium oxide, silicon nitride, and yttrium oxide, aluminum oxide, and aluminum nitride.

14. An electronic device, comprising:
a light-based component;
a transparent member that overlaps the light-based component;
a visible light antireflection coating on the transparent member that includes a stack of thin-film interference filter layers including an uppermost thin-film interference filter layer and a lowermost thin-film interference filter layer between the uppermost thin-film interference filter layer and the transparent member, wherein the uppermost thin-film interference filter layer has first and second opposing surfaces, wherein the first surface of the uppermost thin-film interference filter layer is coupled to an underlying thin-film interference filter layer, and wherein the uppermost thin-film interference filter layer is a graded index layer having a first refractive index at the first surface; and
a fluoropolymer antismudge layer on the second surface of the uppermost thin-film interference filter layer, wherein the uppermost thin-film interference filter layer has a second refractive index at the second surface that is higher than the first refractive index.

15. The electronic device defined in claim 14 wherein the uppermost thin-film interference filter layer comprises a mixture of first and second materials and wherein the first material is silicon nitride.

16. The electronic device defined in claim 15 wherein the light-based component comprises an image sensor.

17. The electronic device defined in claim 14, wherein the transparent member comprises a sapphire member, wherein the visible light antireflection coating further comprises a graded index adhesion layer between the lowermost thin-film interference filter layer and the sapphire member, wherein the graded index adhesion layer includes a mixture of first and second materials, and wherein the first material comprises aluminum oxide.

18. The electronic device defined in claim 14 wherein the uppermost thin-film interference filter layer comprises a first material having a first hardness and a second material having a second hardness that is greater than the first hardness, wherein the first surface is formed from the first material, and wherein the second surface is formed from the second material.

* * * * *